United States Patent [19]

Kroupa

[11] Patent Number: 4,929,391

[45] Date of Patent: May 29, 1990

[54] ELECTRICALLY CONDUCTIVE SILICON COMPOSITIONS

[75] Inventor: Loretta N. Kroupa, Midland, Mich.

[73] Assignee: Dow Corning Corporation, Midland, Mich.

[21] Appl. No.: 221,841

[22] Filed: Jul. 20, 1988

[51] Int. Cl.$^5$ .............................................. H01B 7/06
[52] U.S. Cl. .................................... 252/511; 252/510; 524/262; 524/264
[58] Field of Search ................ 252/510, 511; 524/262, 524/267

[56] References Cited

U.S. PATENT DOCUMENTS

| | | | |
|---|---|---|---|
| 3,099,578 | 7/1963 | Hunter | 117/226 |
| 3,824,208 | 7/1974 | Link et al. | 260/375 |
| 4,032,502 | 6/1977 | Lee et al. | 260/37 |
| 4,250,075 | 2/1981 | Monroe et al. | 260/33.6 |
| 4,273,697 | 6/1981 | Shimizu et al. | 260/37 |
| 4,279,783 | 7/1981 | Kehrer et al. | 252/511 |
| 4,299,736 | 11/1981 | Datta | 252/506 |
| 4,387,046 | 6/1983 | Marsch et al. | 252/511 |
| 4,469,522 | 9/1984 | Matsumoto | 106/308 |
| 4,529,774 | 7/1985 | Evans et al. | 524/860 |

*Primary Examiner*—Josephine Barr
*Attorney, Agent, or Firm*—Edward C. Elliott

[57] ABSTRACT

An improved electrically conductive polydiorganosiloxane of the type comprising a polydiorganosiloxane and conductive carbon particles has been developed. The improved electrical conductivity results from the addition of a conductivity improver comprising disilazane of the formula $(R_3Si)_2NH$ where R is a substituted or unsubstituted alkyl radical of from 1 to 6 carbon atoms or hydroxyl endblocked polymethylphenylsiloxane.

8 Claims, No Drawings

ELECTRICALLY CONDUCTIVE SILICON COMPOSITIONS

BACKGROUND OF THE INVENTION

1. Field of the Invention

This invention relates to silicone compositions which have electrical conductivity which is unusually high and consistent from lot to lot.

2. Background Information

Silicone elastomeric compositions have been made electrically conductive by admixing conductive particles, such as silver particles and various forms of carbon black.

An electrically conductive, heat-producing composition was disclosed by Hunter in U.S. Pat. No. 3,099,578, issued Jul. 30, 1963, in which specific combinations of carbon, silver, and iron particles were mixed into a binder to give pigment concentrations of from 22 to 53 percent of the mixture.

Compositions comprising a mixture of polydiorganosiloxane and greater than 15 percent by weight of electrically conductive carbonaceous particles is taught in U.S. Pat. No. 4,250,075, issued Feb. 10, 1981. The compositions contain greater than 2 percent by weight of phenyl radicals.

Electrically conductive curable liquid organopolysiloxane compositions are disclosed in U.S. Pat. No. 4,273,697, issued Jun. 16, 1981 in which a liquid polyorganosiloxane, crosslinking agent, and a carbon black whose specific surface area is at least 900 m$^2$/g and which are hollow-shell-shaped particles. It may also contain a polydiorganosiloxane having hydroxyl groups at both ends of the molecule.

Graphite fibers were added to an electrically conductive silicone elastomeric mixture in U.S. Pat. No. 4,279,783, issued Jul. 21, 1981. The mixture is intended to be coated on a base member and used as an electrically conductive device, as an automotive ignition cable, for example.

An electrically conductive organopolysiloxane elastomer containing lamp black comprises from 15 to 60 percent by weight furnace black and from 5 to 25 percent by weight acetylene black is described in U.S. Pat. No. 4,387,046, issued Jun. 7, 1983. The resistance increases substantially as the composition is heated. The lowest electrical resistance shown is 110 ohm.cm.

The majority of the past work done with conductive silicone rubber has been intended for use as heating tapes or such and as controlled conductivity wires for ignition cable.

The present work was designed to produce as high an electrical conductivity, or conversely, as low an electrical resistance as possible. The discovery of the present method may make the following references of interest.

U.S. Pat. No. 3,824,208, issued Jul. 16, 1974 teaches a process for forming a free-flowing particulate polymer mixture from a viscous tacky polymer. Included in the mixture are silicone polymers and fillers such as fume silica, both treated and untreated and extending fillers such as carbon and graphite.

A liquid injection moldable silicone composition is described in U.S. Pat. No. 4,032,502, issued Jun. 28, 1977, containing silicone polymer, treated reinforcing silica filler, and a cure system of silicon hydride crosslinker and platinum catalyst.

U.S. Pat. No. 4,299,736, issued Nov. 10, 1981, discloses conductive, thermoplastics molding compositions. The electrical conductivity is improved by treating the conductive carbon particles used with a fatty acid chloride.

U.S. Pat. No. 4,469,522, issued Sept. 4, 1984, teaches a process for treating fillers with a fluorosilicone compound for use in fluorosilicone vulcanizable silicone rubber.

Fluorosilicone treated silica fillers are taught in U.S. Pat. No. 4,529,774, issued Jul. 16, 1985. The treated fillers are taught to be especially compatible with fluorosilicone gums.

The above references teach various methods of making polyorganosiloxanes conductive to electricity to varying degrees, but there is a need for an improvement in the conductivity, particularly in uses where the composition is to be used to transmit electrical current, rather than where it is used as a source of heat upon passage of an electrical current.

SUMMARY OF THE INVENTION

An improved electrically conductive polydiorganosiloxane has been developed. The improved electrical conductivity results from the addition of a conductivity improver comprising disilazane of the formula $(R_3Si)_2NH$ where R is a substituted or unsubstituted alkyl radical of from 1 to 6 carbon atoms, or, in the case of pretreating the carbon particles, hydroxyl endblocked polymethylphenylsiloxane having a viscosity of from 0.1 to 1.0 Pa.s at 25° C.

DESCRIPTION OF THE INVENTION

This invention relates to an electrically conductive composition comprising polydiorganosiloxane and conductive carbon particles, wherein the improvement comprises adding from 6 to 30 parts by weight per 100 parts of the carbon particles of conductivity improver comprising disilazane of the formula $(R_3Si)_2NH$ where R is a substituted or unsubstituted alkyl radical of from 1 to 6 carbon atoms.

This invention also relates to an electrically conductive, curable composition comprising a curable polydiorganosiloxane and a crosslinking agent in combination with carbon particles, wherein the improvement comprises adding from 6 to 30 parts by weight per 100 parts of the carbon particles of conductivity improver comprising disilazane of the formula $(R_3Si)_2NH$ where R is a substituted or unsubstituted alkyl radical of from 1 to 6 carbon atoms.

This invention also relates to an improved carbon particle for use in electrically conductive compositions in which the carbon particle is treated with a conductivity improver before being mixed with polydiorganosiloxane; the conductivity improver being selected from the group consisting of disilazane of the formula $(R_3Si)_2NH$ where R is a substituted or unsubstituted alkyl radical of from 1 to 6 carbon atoms, and hydroxyl endblocked polymethylphenylsiloxane having a viscosity of from 0.1 to 1.0 Pa.s at 25° C.

This invention also relates to a method of preparing an improved electrically conductive carbon particle comprising (A) adding 100 parts by weight of inert solvent to a mixer, (B) admixing from 6 to 30 parts by weight per 100 parts by weight of the carbon particles of (C) of conductivity improver selected from the group consisting of disilazane of the formula $(R_3Si)_2NH$ where R is a substituted or unsubstituted alkyl radical of from 1 to 6 carbon atoms, and hydroxyl endblocked polymethylphenylsiloxane having a viscosity of from 0.1 to 1.0 Pa.s, (C) admixing from 3 to 40 parts by weight of conductive carbon particles, and (D) drying and powdering the resulting hydrophobic carbon particles.

The improvement in electrical conductivity of the composition of this invention is due to the addition of a conductivity improver to a mixture of polydiorganosiloxane and carbon particles. A conductivity improver comprises disilazane of the formula $(R_3Si)_2NH$ where R is a substituted or unsubstituted alkyl radical of from 1 to 6 carbon atoms. R is, for example, methyl, ethyl, phenyl, vinyl, or 3,3,3-trifluoropropyl radical, and combinations of these radicals. Preferred are disilazane in which R is methyl or 3,3,3-trifluoropropyl radical. Preferred disilazanes are hexamethyldisilazane and tetramethyldi(3,3,3-trifluoropropyl)disilazane. In the case of the method of preparing an improved electrically conductive carbon particle, the conductivity improver can also be a hydroxyl endblocked polymethylphenylsiloxane having a viscosity of from 0.1 to 1.0 Pa.s at 25° C.

The disilazanes can be produced by reacting the appropriate chlorosilane with ammonia, using enough of the chlorosilane to obtain the disilazane. The reaction is preferably carried out in a solvent. The hydroxyl endblocked polymethylphenylsiloxane can be produced by hydrolysis of methylphenyltetracyclosiloxane. Both of these preparations are well known in the art.

The polydiorganosiloxane used in this invention can be any of the well known siloxane polymers having the unit formula $R'_aSiO_{4-a/2}$ where R' is a substituted or unsubstituted monovalent hydrocarbon radical having from 1 to 10 carbon atoms and a is from 1 to 3 and where a is preferably an average of from about 1.8 to 2.2, preferably from 1.95 to 2.05. The preferred siloxanes are polydiorganosiloxane where the molecular weight is sufficient to give the polymer a viscosity of from 0.3 to 1,000 or greater Pa.s at 25° C. The polymer can be endblocked with a non-reactive group such as trimethylsilyl to give a non-reactive fluid. The polymer can also be endblocked with a reactive group such as hydroxyl or alkoxy to give a polymer which can be reacted with a crosslinking agent to give a curable system. The preferred R' groups are methyl, ethyl, vinyl, phenyl, and 3,3,3-trifluoropropyl as these are the groups commonly available at the present time.

Carbon particles are added to polydiorganosiloxane in order to obtain electrical conductivity. Carbon particles for this purpose include finely divided carbon blacks such as Shawinigan black and furnace black, graphite particles, super conductive carbon black such as Ketjenblack EC from Akzo Chemie, and fibers of carbon or graphite. Shawinigan black is an acetylene black which is known as a material which is useful in producing electrically conductive compositions. Ketjenblack is a unique super-conductive carbon black having a surface area of greater than 900 m²/g. This high surface area gives a lower electrical resistance at a given loading of carbon black than is possible with the more conventional carbon blacks. These carbon blacks are commercial materials well known for use in obtaining electrical conductivity. In addition to the carbon blacks, conductive fibers can also be added to increase the electrical conductivity. The fibers can be either of carbon or graphite, preferably in lengths of about ¼ inch or less and without any coating on their surface, such as is used when graphite fibers are used as physical reinforcement in plastic articles.

Electrically conductive pastes and greases can be produced by mixing 100 parts by weight of the polydiorganosiloxane, from 3 to 40 parts by weight of carbon particles, and from 6 to 30 parts by weight of conductivity improver per 100 parts by weight of the carbon particles to give a uniform mixture with the carbon particles uniformly and finely dispersed throughout the mixture. This mixing can be done in a shear mixer such as a dough mixer having sigma blades or in a mixer such as a Waring blender. When the loading of carbon black is high enough, such as above about 25 percent by weight carbon black, the mixture may be in the form of a fine powder when mixing is complete. This powder can be reduced to a paste or grease by milling it on a two roll mill.

An electrically conductive silicone composition curable to an elastomer can be prepared by (A) adding 100 parts by weight of curable polydiorganosiloxane to a shearing mixer, (B) admixing from 3 to 40 parts by weight of conductive carbon particles, and from 6 to 30 parts by weight per 100 parts by weight of the carbon particles of a conductivity improver comprising disilazane of the formula $(R_3Si)_2NH$ where R is a substituted or unsubstituted alkyl radical of from 1 to 6 carbon atoms, (C) removing the mixture from the mixer and placing the mixture on a two roll mill, where it is massed and admixed with means for curing the polydiorganosiloxane, to give a curable composition which has a high electrical conductivity when cured and resists change in conductivity when processed.

An electrically conductive composition which cures can be produced by mixing any of the known curable silicone polymer systems with electrically conductive carbon particles and conductivity improver. Many curable silicone polymer systems are known. Systems which are cured through the use of organic peroxides are commonly used in the production of silicone rubber. The organic peroxides, such as 2,4-dichlorobenzoyl peroxide, benzoyl peroxide, tertiary-butyl perbenzoate, and 2,5,bis (tertbutyl peroxy)-2,5-dimethylhexane, are commonly used with siloxane polymers having methyl or methyl and vinyl radicals. Upon heating during press curing, the peroxide forms radicals which react with the organic groups in the siloxane and cause them to react with each other, forming crosslinks between the molecules to give a cured elastomer. Many other cure systems are known which make use of reactive groups on the siloxane polymer, in particular hydroxyl groups and alkoxy groups for systems which are cured upon exposure to moisture and vinyl and hydrogen groups which are cured in the presence of a catalyst such as platinum. In the case of the moisture curable compositions, a multifunctional crosslinking agent and catalyst are usually also present.

The preferred method of producing the curable electrically conductive silicone composition uses a shear mixer, such as a dough mixer with sigma blades. A portion of the polymer is placed in the mixer and conductivity improver is admixed. Then the conductive carbon particles are gradually added with mixing. As the carbon particles are added, they mix into the polymer to give a smooth paste initially. As more carbon particles are added, a point is reached at which the mixture becomes particles. Additional ingredients, including more carbon particles can be added to the powdered mixture and mixing continued to yield a finely divided black powder which closely resembles carbon black filler. This powdered mixture can be reduced to a paste by passing it through a two roll mill. A preferred method of producing a mixture which starts out with a high viscosity fluid or gum mixes the polymer and carbon particles in the above manner to produce a powder. Additional ingredients such as heat stability additives or powdered peroxides can be added at this powder state. The mixture is then passed through a two roll mill, without excessive heating, to give a paste or gum which can then be molded into the desired shape and cured.

In cases in which a moisture curable paste is the end product, the polymer and carbon black can be prepared as above, additional powdered ingredients added to the powder and then additional liquid ingredients added during the massing step on a two roll mill. Of course, in the cases where the cure system is activated by moisture, the mixing must take place in the absence of moisture if a storage stable product is desired.

An additional step can be added in the process in which the mixture of (A) and (B) is subjected to a temperature of at least 100° C. for a period of at least ½ hour before removing from the shearing mixer. This step is felt to produce a more uniform mixture with a lower electrical conductivity.

The carbon particles can also be treated with conductivity improver before being mixed with the polydiorganosiloxane. A useful method placed 2700 parts by weight of solvent (toluene) in a stirred container, then added increments of carbon particles (Ketjen 600) and conductivity improver (hexamethyldisilazane) to the solvent, along with some water to allow the hydrolysis of the disilazane to take place. A total of 150 parts of carbon particles, 15 parts of conductivity improver, and 5 parts of water were added. After mixing till homogeneous, the mixing was continued for 4 hours, then the mixture was poured into shallow trays and the solvent allowed to evaporate. The treated carbon particles were further dried by heating for a few minutes at 150° C. The previously hydrophilic carbon particles were found to be hydrophobic after this treatment. Further work resulted in the discovery that hydroxyl endblocked polymethylphenylsiloxane having a viscosity of about 0.5 Pa.s at 25° C. and about 4.5 weight percent silicon-bonded hydroxyl radicals was also useful as a conductivity improver when it was used in this conductive filler treatment process rather than in the in situ treatment process. This process can be described as a method of preparing an improved electrically conductive carbon particle comprising (A) adding 100 parts by weight of inert solvent to a mixer, (B) admixing from 6 to 30 parts by weight per 100 parts by weight of the carbon particles of (C) of conductivity improver selected from the group consisting of disilazane of the formula $(R_3Si)_2NH$ where R is a substituted or unsubstituted alkyl radical of from 1 to 6 carbon atoms, and hydroxyl endblocked polymethylphenylsiloxane having a viscosity of from 0.1 to 1.0 Pa.s, (C) admixing from 3 to 40 parts by weight of conductive carbon particles, and (D) drying and powdering the resulting hydrophobic carbon particles.

The inert solvent used in step (A) above can be any solvent which does not react with the conductivity improver so as to interfere with its reaction with the carbon particles. A preferred inert solvent is an aromatic hydrocarbon such as toluene or xylene. Toluene is the preferred inert solvent. Solvents which would not be preferred are those such as alcohols or water containing solvents where a reaction between the solvent or water would be expected with the disilazane conductivity improver or with the hydroxyl endblocked polymethylphenylsiloxane conductivity improver.

The improved electrically conductive carbon particles that are produced by the above process are used to prepare an electrically conductive silicone composition curable to an elastomer by a method comprising (A) adding 100 parts by weight of hydroxyl endblocked polydiorganosiloxane to a shearing mixer, (B) admixing from 3 to 40 parts by weight of the treated conductive carbon particles, (C) removing the mixture from the mixer and placing the mixture on a two roll mill, where it is massed and admixed with means for curing the polydiorganosiloxane, to give a curable composition which has a high electrical conductivity when cured and resists change in conductivity when processed.

The compositions of this invention are electrically conductive compositions which can be in the form of pastes or greases, or can be curable compositions which give elastomeric compositions useful as electrical contacts, conductors, coatings, and such. The presence of the conductivity improver gives a composition having lower electrical resistance or higher conductivity than would be otherwise obtained.

The following examples are included for illustrative purposes only and should not be construed as limiting the invention, which is properly set forth in the appended claims. All parts are parts by weight.

EXAMPLE 1

A base was prepared by mixing in a dough mixer, 51.5 parts of dimethylvinylsiloxy endblocked polydiorganosiloxane having 92.4 mol percent dimethylsiloxane, 7.5 mol percent methylphenylsiloxane, and 0.15 mol percent methylvinylsiloxane units with a Williams plasticity of about 80, 1.8 parts water, 4 parts tetramethyldi(3,3,3-trifluoropropyl)disilazane as conductivity improver additive, 9 parts of super-conductive carbon black (Ketjen 600) and 23 parts of electroconductive carbon black (Shawinigan), 5.5 parts methylphenylvinylsiloxy endblocked polydiorganosiloxane copolymer having dimethylsiloxy and methylphenylsiloxy units so that the polymer is about 7.5 mole percent phenyl and having a viscosity of about 2.0 Pa.s at 25° C., and 3 parts of carbon fibers having a length of about ¼ inch. The mixture after mixing was in the form of a powder, not unlike the carbon black filler.

Then 100 parts of the above powder was placed on a 2-roll mill and massed. Then 1 part of trimethylsiloxy endblocked polymethylhydrogensiloxane having a viscosity of about 0.13 Pa.s at 25° C. and a silicon-bonded hydrogen atom content of about 1.6 percent by weight, 0.8 part of chloroplatinic acid complex of divinyltetramethyldisiloxane diluted with dimethylvinylsiloxy endblocked polydimethylsiloxane to provide 0.7 weight percent platinum, and 0.24 part of methyl butynol were milled into the base (stock A).

A sample of the composition was molded into a sheet by pressing at a temperature of 150° C. for 5 minutes. The sheet was then tested for electrical conductivity in accordance with ASTM D 4496. The result is shown in Table 1.

The above procedure was repeated, except the base was heated for 1 hour at 175° C. under vacuum to remove any volatile material. This base was then massed and catalyzed as above (stock B) and a test sheet prepared and tested as above, with the results shown in Table 1.

Each of the above was duplicated to study reproducability.

TABLE 1

|  | Additive/<br>Carbon Black<br>parts | Volume<br>Resistivity<br>ohm-cm |
|---|---|---|
| Stock A | 4/35 | 0.67 |
| repeat |  | 0.60 |
| Stock B | 4/35 | 0.36 |
| repeat |  | 0.32 |

When an additional 3 parts of the electrical conductivity additive was milled into the uncured stock A and the modified stock was cured and tested as above, the volume resistivity was reduced to 0.4 ohm-cm.

EXAMPLE 2

A series of compositions were prepared to evaluate various silicone fluids as conductivity improver additives.

A base material was prepared by mixing in a sigma blade dough mixer 59.9 parts of the polydiorganosiloxane of example 1, 22.9 parts of the electroconductive carbon black of example 1, 9 parts of the super-conductive carbon black of example 1, 7 parts of the methylphenylvinylsiloxy endblocked polydiorganosiloxane copolymer of example 1, 0.22 part of methylvinylcyclosiloxane, and 1.06 part of the polylmethylhydrogensiloxane of example 1. The mixture was prepared by first adding about 90 percent of the polydiorganosiloxane to the mixer along with 50 percent of the electroconductive carbon black. After this had mixed to form a uniform paste, the other half of this carbon black was added and mixed until uniform. Then ⅓ of the superconductive carbon black and ⅓ of the polydiorganosiloxane copolymer were added and mixed until uniform. The remainder of the ingredients were then added in increments until the entire formulation was mixed into a smooth, uniform paste. Then half the formulation was removed and 3 percent of carbon fibers having a length of about ¼ inch were added and mixed until uniform. This was base A A duplicate composition was prepared. This is base B.

Curable compositions were then prepared by mixing on a two roll mill 100 grams of base, 0.32 g of the platinum catalyst mixture of example 1, and the grams of conductivity improvement additive shown in Table II. The formulations of the various additives are shown in the table.

Each composition was then pressed into a sheet about 0.075 inches thick and cured by heating for 5 minutes at 150° C. The volume resistivity of each sample was then measured as shown in Table II.

TABLE II

| Base | Additive | Amount | Volume Resistivity |
|---|---|---|---|
| A | none | none | 1.04 ohm-cm |
| B | none | none | 1.10 |
| A | A* | 3 g | 1.15 |
| B | A* | 6 g | 0.94 |
| A | B* | 6 g | 0.86 |
| B | C* | 5 g | 1.23 |
| B | C* | 10 g | 1.10 |
| A | D | 3 g | 0.43 |
| B | D | 1 g | 0.39 |
| B | D | 3 g | 0.66 |

TABLE II-continued

| Base | Additive | Amount | Volume Resistivity |
|---|---|---|---|
| B | E | 1 g | 0.67 |
| B | E | 3 g | 0.43 |

*comparative examples

Additive A is hydroxyl endblocked polymethylphenylsiloxane having a viscosity of about 0.5 Pa.s at 25° C. and about 4.5 weight percent silicon-bonded hydroxyl radicals Additive B is hydroxyl endblocked methyl(trifluoropropyl)polysiloxane having a viscosity of about 0.1 Pa.s at 25° C. and about 6 weight percent hydroxyl radicals Additive C is trimethylsilyl endblocked diorganosiloxane fluid having dimethylsiloxy units and methylphenylsiloxy units so that the organo groups are 10 percent phenyl Additive D is tetramethyldi(3,3,3-trifluoropropyl)disilazane Additive E is hexamethyldisilazane The table clearly shows that the disilazane materials are superior additives for reducing the volume resistivity of the cured compositions.

EXAMPLE 3

Three bases were prepared which illustrate the lowering of the volume resistivity of an electrically conductive base by the addition of the conductivity improver additive D, tetramethyldi(3,3,3-trifluoropropyl)disilazane.

Base A was prepared by mixing in a manner similar to that detailed above, using the ingredients of example 1, 681.6 g of the polydimethylsiloxane, 276 g of the electroconductive carbon black, 108 g of the super-conductive carbon black, 72 g of the polydiorganosiloxane copolymer, and 48 g of the carbon fibers.

Base B was prepared by mixing a similar composition except a portion of the polydimethylsiloxane was replaced with 69.6 g of water.

Base C was prepared by mixing a similar composition to base A except a portion of the polydiorganosiloxane was replaced with 21.6 g of water and 48 g of tetramethyldi(3,3,3-trifluoropropyl)disilazane.

Each base was then made curable by mixing 100 g of base with 0.8 g of the platinum catalyst, 1 g of the polymethylhydrogensiloxane, and 0.24 g of methyl butynol as in example 1. After pressing and curing the volume resistivity was measured as shown in Table III.

TABLE III

| Base | Volume Resistivity |
|---|---|
| A* | 0.70 ohm-cm |
| B* | 0.61 |
| C | 0.54 |

*comparative example

The use of the conductivity improver additive, tetramethyldi(3,3,3-trifluoropropyl)disilazane, gave improved conductivity.

EXAMPLE 4

A series of two part flowable, curable compositions were prepared to show the use of the conductivity additive hexamethyldisilazane.

A comparative base A1 was prepared by mixing 1002 g of dimethylvinylsilyl endblocked polydimethylsiloxane fluid having a viscosity of about 2.1 Pa.s at 25° C., 267 g of a mixture of 65 percent by weight of dimethylvinylsiloxy endblocked polydimethylsiloxane having a viscosity of about 2.1 at 25° C. and 35 percent by weight of a benzene soluble resin copolymer of triorganosiloxy units and SiO2 units in the mol ratio of about 0.7 mol of triorganosiloxy unit per mol of SiO2 unit where the triorganosiloxy units are trimethylsiloxy units and dimethylvinylsiloxy units and the resin copolymer has from 0.4 to 2.2 weight percent silicon-bonded vinyl radicals, 94.5 of the super-conductive carbon black of example 1, 135 g of fumed silica having a surface area of about 250 $m^2/g$ and a surface treated to give dimethylsiloxy groups, and 4.8 g of the platinum catalyst mixture of example 1.

Base A2 was prepared as in base A1, but the amount of the dimethylvinylsiloxy endblocked polydimethylsiloxane was reduced to 957 g and the amount of the mixture of polydimethylsiloxane and resin copolymer was reduced to 252 g. Additional ingredients added were 45 g of hexamethyldisilazane as conductivity additive, and 15 g of water. This left the percentage of super conductive carbon black at the same level as in base A1.

Base A3 was prepared using the same formulation as for base A2, except the treated filler was replaced with the same amount of an untreated fumed silica filler having a surface area of about 250 $m^2/g$.

The above series of bases was repeated, using the other half of the cure system in each case as follows.

Comparative base B1 was prepared by mixing 808.5 g of dimethylvinylsilyl endblocked polydimethylsiloxane fluid having a viscosity of about 2.1 Pa.s at 25° C., 382.5 g of a mixture of 65 percent by weight of dimethylvinylsiloxy endblocked polydimethylsiloxane having a viscosity of about 2.1 at 25° C. and 35 percent by weight of a benzene soluble resin copolymer of triorganosiloxy units and SiO2 units in the mol ratio of about 0.7 mol of triorganosiloxy unit per mol of SiO2 unit where the triorganosiloxy units are trimethylsiloxy units and dimethylvinylsiloxy units and the resin copolymer has from 1.4 to 2.2 weight percent silicon-bonded vinyl radicals, 84 g of the super-conductive carbon black of example 1, 138 g of fumed silica having a surface area of about 250 $m^2/g$ and a surface treated to give dimethylsiloxy groups, 82.5 g of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent and 5.25 g of methyl butynol.

Base B2 was prepared as in base B1, but the amount of the dimethylvinylsiloxy endblocked polydimethylsiloxane was reduced to 763.5 g and the amount of the mixture of polydimethylsiloxane and resin copolymer was reduced to 367.5 g. Additional ingredients added were 45 g of hexamethyldisilazane as conductivity additive, and 15 g of water. This left the percentage of super conductive carbon black at the same level as in base B1.

Base B3 was prepared using the same formulation as for base B2, except the treated filler was replaced with the same amount of an untreated fumed silica filler having a surface area of about 250 $m^2/g$.

Curable compositions were then prepared by mixing 50 g of base A1 and 50 g of base B1 together and pressing into a sheet and curing for 5 minutes at 150° C. The volume resistivity of each sheet was then measured with the result shown in Table IV. Curable compositions were made and tested using A2 and B2, and using A3 and B3.

TABLE IV

| Base | Volume Resistivity |
|---|---|
| A* | 14.34 ohm-cm |
| B | 12.3 |
| C | 10.26 |

*comparative example

The conductivity additive lowered the volume resistivity of the cured composition containing it, in the case when the fumed silica filler was treated and also when it was not treated.

EXAMPLE 5

Compositions were prepared in which the conductive carbon black was treated with a conductivity improver before being added to the polydiorganosiloxane.

A 12 liter glass flask was filled with 4460 g (100 pts) of toluene. Then 23.6 g (15.0 pts per 100 pts of carbon black) of hexamethyldisilazane and 7.85 g of water was stirred and dispersed in the toluene. Next 157 g (3.5 pts) of the super-conductive carbon black of Example 1 was stirred in, in 6 equal increments, uniformly dispersing each increment before the next was added. The final mixture had the consistency of a thick slurry. Mixing was continued for 4 hours, then the treated carbon black was spread out in a tray and allowed to dry by evaporation of the toluene. The resulting cake was broken up into a powder of treated carbon black. The original carbon black was hydrophilic, after treatment, it was hydrophobic. This is treated filler A.

The above procedure was repeated, except the treating agent was hydroxyl endblocked polymethylphenylsiloxane having a viscosity of about 0.5 Pa.s at 25° C. and about 4.5 weight percent silicon-bonded hydroxyl radicals and there was no water added. The carbon black was hydrophobic after treatment. This is treated filler B.

An uncatalyzed stock was prepared by mixing in a dough mixer 30 parts of dimethylvinylsilyl endblocked polydimethylsiloxane fluid having a viscosity of about 2.1 Pa.s at 25° C., 6 parts of the above filler A, 9.1 parts of a fumed silica filler having a surface treated with dimethyldichlorosilane, and 7 parts of a mixture of 65 percent by weight of dimethylvinylsiloxy endblocked polydimethylsiloxane having a viscosity of about 2.1 at 25° C. and 35 percent by weight of a benzene soluble resin copolymer of triorganosiloxy units and SiO2 units in the mol ratio of about 0.7 mol of triorganosiloxy unit per mol of SiO2 unit where the triorganosiloxy units are trimethylsiloxy units and dimethylvinylsiloxy units and the resin copolymer has from 1.4 to 2.2 weight percent silicon-bonded vinyl radicals, until a stiff uniform mass was formed. The material was then heated at about 150° C. for 45 minutes with a vacuum applied to the mixer to remove any volatile materials. Then 30 parts of the polydimethylsiloxane and 14.5 parts of the above polymer-resin mixture was added and mixed until uniform and the mixture was cooled. Then 2.75 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent and 0.18 part of methyl butynol was admixed to give the uncatalyzed stock. The stock was catalyzed by mixing 100 parts of the uncatalyzed stock with 0.16 part of chloroplatinic acid complex of divinyltetramethyldisiloxane diluted with dimethylvinylsiloxy endblocked polydimethylsiloxane to provide 0.7 weight percent platinum, and test slabs were prepared by pressing the stock into a sheet and curing for 5 minutes at 150° C. in a press. The electrical conductivity of the cured sheet was measured as in Example 1 with the result shown in Table V.

The treated filler B was used to make a similar stock by following the same procedure as above. A comparative example was prepared by making a similar stock, but using carbon black which was untreated.

A treated in-situ sample was prepared from the same ingredients

TABLE V

| Filler | Volume resistivity ohm-cm |
|---|---|
| A | 29.4 |
| B | 12.3 |
| untreated* | 44.8 |
| repeat* | 45.9 |
| in-situ | 9.4 |
| repeat | 8.8 |

*comparative example

The treated super-conductive carbon black gives an improved conductivity, whether treated before compounding or in situ, when compared to the same formulation made with untreated super-conductive carbon black.

EXAMPLE 6

A 12 liter glass flask was filled with 5150 g of toluene. Then 62.1 g of hexamethyldisilazane and 20.8 g of water was stirred and dispersed in the toluene. Next 520 g of the conductive carbon black of Example 1 was stirred in, in 6 equal increments, uniformly dispersing each increment before the next was added. The final mixture had the consistency of a thick slurry. Mixing was continued for 4 hours, then the treated carbon black was dried by spreading it in a tray and allowing the toluene to evaporate. The cake was then broken up into a treated powder. The original carbon black was hydrophilic, after treatment, it was hydrophobic. This is treated filler C.

The above procedure was repeated, except the toluene level was reduced to 3500 g and the treating agent was 62.4 g of the hydroxyl endblocked polymethylphenylsiloxane having a viscosity of about 0.5 Pa.s at 25° C. and about 4.5 weight percent silicon-bonded hydroxyl radicals and there was no water added. The carbon black was hydrophobic after treatment. This is treated filler D.

Catalyzed stocks were prepared in the same manner as in Example 5, except the polymer was reduced to a total of 50.5 parts and the treated filler was raised to 16 parts, since this is a lower conductivity carbon black. A stock was also prepared using the untreated carbon black. The stocks were molded and tested as in Example 5, with the results shown in Table VI

TABLE VI

| Filler | Volume Resistivity ohm-cm |
|---|---|
| C | 112 |
| D | 116 |
| untreated* | would not cure |

*comparative example

Adding additional catalyst by doubling the amount would not give a cure. When the amount of catalyst was raised to 2 parts, cure resulted, but the cured stock was not conductive, that is the volume resistivity was greater than $10^{10}$ ohm-cm.

EXAMPLE 7

Carbon fibers were treated by placing 2500 g of toluene in a 5 liter flask and admixing 24 g of hexamethyldisilazane and 8 gm of water, then adding 200 g of the carbon fibers of Example 1.

The material was mixed for 2 hours, then placed in a tray and the toluene allowed to evaporate, yielding treated carbon fibers. The fibers were hydrophilic prior to treatment and hydrophobic after treatment.

Each of the stocks of Example 5 was mixed with 3 weight percent of the treated carbon fibers and test slabs were prepared as for the stocks, with the results shown in Table VII.

A comparative set of stocks were prepared by mixing 3 weight percent of untreated carbon fibers with each of the same stocks and test slabs were prepared as for the stocks, with the results shown in Table VII.

TABLE VII

| Filler | Treated Fiber | Untreated Fiber |
|---|---|---|
| | Volume Resistivity | |
| | ohm-cm | ohm-cm |
| A | 1.26 | 1.76 |
| B | 1.19 | 1.35 |
| untreated | 1.45 | 1.93* |

*comparative example

In each case, treatment of the carbon fiber improved the electrical conductivity of the resulting cured stock.

That which is claimed is:

1. An electrically conductive composition comprising polydiorganosiloxane and conductive carbon particles, wherein the improvement comprises adding from 6 to 30 parts by weight per 100 parts of the carbon particles of conductivity improver comprising disilazane of the formula $(R_3Si)_2NH$ where R is a substituted or unsubstituted alkyl radical of from 1 to 6 carbon atoms.

2. An electrically conductive, curable composition comprising a curable polydiorganosiloxane and a cross-linking agent in combination with conductive carbon particles, wherein the improvement comprises adding from 6 to 30 parts by weight per 100 parts of the carbon particles of conductivity improver comprising disilazane of the formula $(R_3Si)_2NH$ where R is a substituted or unsubstituted alkyl radical of from 1 to 6 carbon atoms.

3. The electrically conductive silicone composition of claim 1 in which the polydiorganosiloxane is polydiorganosiloxane having a viscosity of from 0.3 to 1,000 or greater Pa.s at 25° C., the organo groups being substituted or unsubstituted monovalent hydrocarbon groups having from 1 to 10 carbon atoms, and the conductive carbon particles are present in an amount of from 3 to 40 parts by weight per 100 parts of polydiorganosiloxane.

4. A method of preparing an electrically conductive silicone composition comprising
(A) adding 100 parts by weight of polydiorganosiloxane to a shearing mixer,
(B) admixing from 3 to 40 parts by weight of conductive carbon particles, and from 6 to 30 parts by weight per 100 parts by weight of the carbon particles of conductivity improver comprising disilazane of the formula $(R_3Si)_2NH$ where R is a substituted or unsubstituted alkyl radical of from 1 to 6 carbon atoms.

5. The method of claim 4 in which the mixture of (A) and (B) is subjected to a temperature of at least 100° C. for a period of at least ½ hour before removing from the shearing mixer.

6. The method of claim 4 in which the mixture after step (B) is in the form of a powder.

7. A method of preparing an electrically conductive silicone composition curable to an elastomer comprising
(A) adding 100 parts by weight of curable polydiorganosiloxane to a shearing mixer,
(B) admixing from 3 to 40 parts by weight of conductive carbon particles, and from 6 to 30 parts by weight per 100 parts by weight of the carbon particles of a conductivity improver comprising disilazane of the formula $(R_3Si)_2NH$ where R is a substituted or unsubstituted alkyl radical of from 1 to 6 carbon atoms,
(C) removing the mixture from the mixer and placing the mixture on a two roll mill, where it is massed and admixed with means for curing the polydiorganosiloxane, to give a curable composition which has a high electrical conductivity when cured and resists change in conductivity when processed.

8. A method of preparing an electrically conductive silicone composition curable to an elastomer comprising
(A) adding 100 parts by weight of hydroxyl endblocked polydiorganosiloxane to a shearing mixer,
(B) admixing from 3 to 40 parts by weight of treated conductive carbon particles obtained from a method of preparing an improved electrically conductive carbon particle comprising
  (a) adding 100 parts by weight of inert solvent to a mixer,
  (b) admixing from 6 to 30 parts by weight per 100 parts by weight of the carbon particles of (C) of conductivity improver selected from the group consisting of disilazane of the formula $(R_3Si)_2NH$ where R is a substituted or unsubstituted alkyl radical of from 1 to 6 carbon atoms, and hydroxyl endblocked polymethylphenylsiloxane having a viscosity of from 0.1 to 1.0 Pa.s at 25° C.,
  (c) admixing from 3 to 40 parts by weight of conductive carbon particles, and
  (d) drying and powdering the resulting hydrophobic carbon particles.
(C) removing the mixture from the mixer and placing the mixture on a two roll mill, where it is massed and admixed with means for curing the polydiorganosiloxane, to give a curable composition which has a high electrical conductivity when cured and resists change in conductivity when processed.

* * * * *